UNITED STATES PATENT OFFICE.

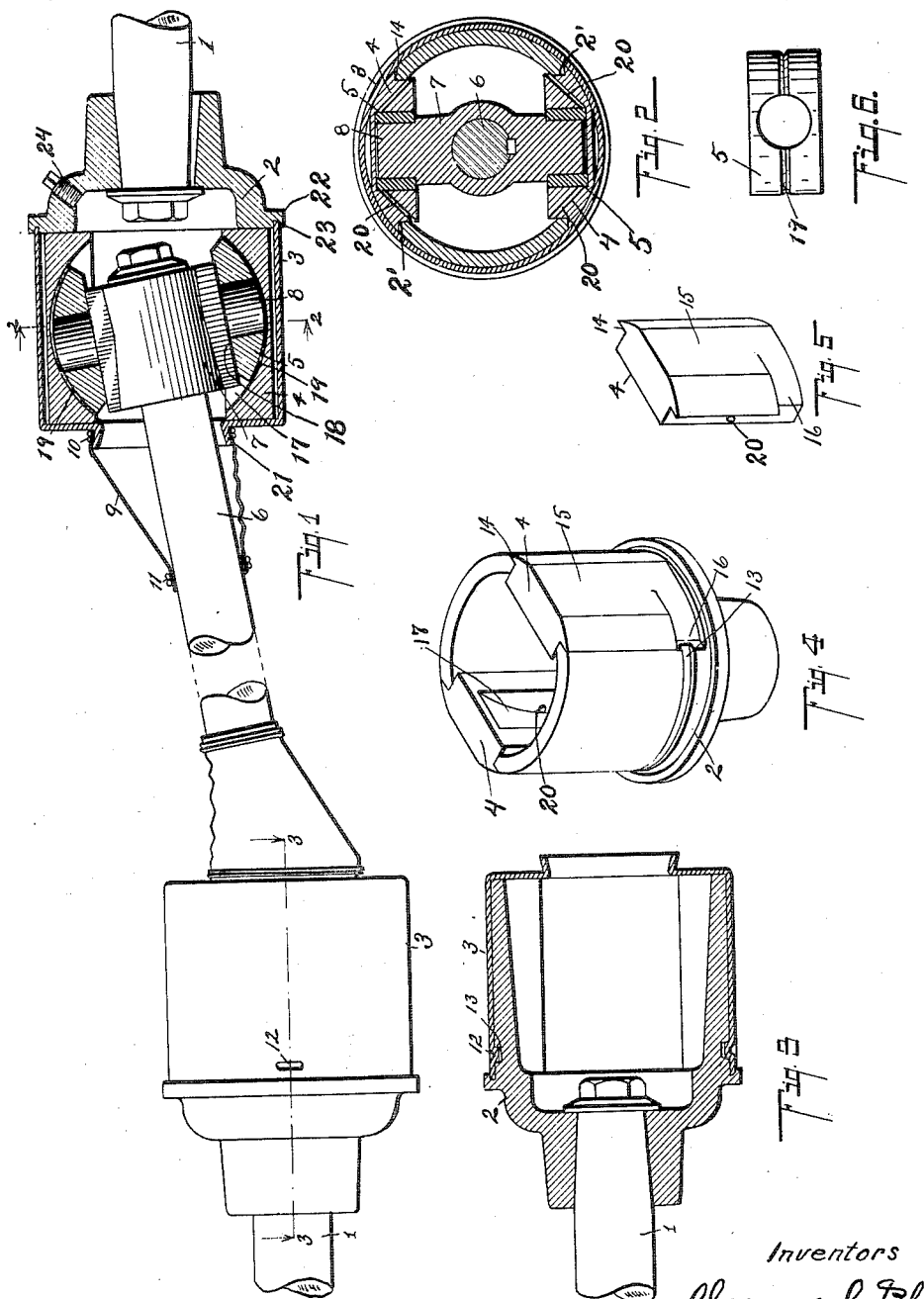

CLARENCE C. BLOOD, HOWARD E. BLOOD, AND MAURICE E. BLOOD, OF KALAMAZOO, MICHIGAN.

UNIVERSAL JOINT.

1,044,734.  Specification of Letters Patent.  Patented Nov. 19, 1912.

Application filed January 25, 1910, Serial No. 540,091. Renewed September 28, 1912. Serial No. 722,978.

*To all whom it may concern:*

Be it known that we, CLARENCE C. BLOOD, HOWARD E. BLOOD, and MAURICE E. BLOOD, citizens of the United States, residing at the city of Kalamazoo, county of Kalamazoo, State of Michigan, have invented certain new and useful Improvements in Universal Joints, of which the following is a specification.

This invention relates to improvements in universal joints.

The main objects of this invention are: First, to provide an improved universal joint by which the parts are simple in structure and easily assembled, and one which can be readily disassembled and reassembled, should occasion require for the renewal of any of the wearing parts. Second, to provide an improved universal joint which is desirable in use and economical to produce. Third, to provide an improved universal joint in which the bearing parts are effectively lubricated.

Further objects, and objects relating to structural details, will definitely appear from the detailed description to follow.

We accomplish the objects of our invention by the devices and means described in the following specification. The structure described constitutes one effective embodiment of our invention. Other embodiments would be readily devised by those skilled in the art.

The invention is clearly defined and pointed out in the claims.

A structure constituting an effective and preferred embodiment of the features of our invention is clearly illustrated in the accompanying drawing, forming a part of this specification, in which:

Figure 1 is a detail side elevation of a structure embodying the features of our invention, with parts shown in the central longitudinal section. Fig. 2 is a transverse section taken on a line corresponding to line 2—2 of Fig. 1. Fig. 3 is a detail longitudinal section through the shaft member 2, and the shell 3, taken on a line corresponding to line 3—3 of Fig. 1. Fig. 4 is a perspective view of the shaft member 2, with the bearing blocks 4 assembled therein. Fig. 5 is a rear perspective view of one of the bearing blocks 4. Fig. 6 is a rear view of one of the journal bearing blocks 5 showing the arrangement of the lubricating groove or passage therein.

In the drawings, similar reference characters refer to similar parts throughout the several views, and the sectional views are taken looking in the direction of the little arrows at the ends of the section lines.

Referring to the drawing, 1—1 represent the shafts to be coupled and 6 the coupling shaft, the structure illustrated having two of our improved joints therein. The description of one of these joints will suffice, as they are preferably duplicates. On the shaft 6 is a shaft member 7 having transversely disposed journals 8. Bearings 5 are provided for these journals. These journal bearings 5 are supported in bearing blocks 4 carried by the shaft member 2. The shaft member 2 is preferably cylindrical in form, as illustrated, and provided with longitudinal slot-like openings 2', adapted to receive the bearing blocks 4. These blocks 4 have rib-like flanges 14 adapted to engage the edges of these slots, as clearly appears in Fig. 2. The bearing blocks 4 are retained or secured in position by the shell-like member 3, which is also preferably cylindrical in form and adapted to closely fit the shaft member 2 and the bearing blocks 4, the bearing blocks 4 being provided with portions of the same curvature as the member 2. The shell-like member 3 coacts with the member 2 in providing a casing for the parts, as well as serving as a clamping member for securing them in position.

The blocks 4 are provided with curved longitudinal bearing seats 17 for the bearings 5, the bearings 5 having surfaces correspondingly curved so that they move freely in the bearing seats 17. The inner faces of the member 5 are bearing surfaces adapted to coact with the thrust bearing surfaces 18 on the member 7. The openings in the bearings 5 for the journals preferably extend entirely through the bearings 5 to permit effective lubrication. The members 5 are preferably provided with longitudinal grooves 19 for the passage of the lubricant.

The bearing blocks 4 are preferably provided with transversely disposed passages 20, opening into the bearing seat 17, so that as the coupling is revolved the lubricant is carried into the bearings. To exclude dust and prevent the escape of the lubricant, we preferably provide a casing 9 of flexible material which is secured at one end of the flange 21 about the shaft opening in the shell 3, the casing being preferably secured by wire 10, as shown in the drawings. The other end of this casing is secured by means of the wire 11 to the shaft.

To make a tight joint between the shell 3 and coupling member 2, we preferably provide the member 2 with an annular flange 22, having a groove 23 therein, adapted to receive the end of the shell. A suitable packing ring or gasket is preferably arranged in the groove.

The shell is secured in position in the structure illustrated by providing the member 2 with spiral grooves 13, adapted to receive the lugs 12 on the shell, so that the shell may be slipped upon the shaft member 2 and turned to bring the lugs into engagement with these grooves and clamped into position. To accommodate the lugs 12 the bearing blocks 4 are preferably cut away at 15 and 16, (see Fig. 4). With the parts thus formed they can be readily assembled without the aid of screws, bolts or the like. The bearings are firmly supported.

The members 2 and 3 are preferably formed as stated, to provide a casing for the parts and serve as a lubricant receptacle or retainer, so that the bearing can be lubricated by introducing the lubricant through the opening 24, and as the bearing parts within the casing are all exposed to the lubricant in the interior, very effective lubrication is secured.

Our improved bearing is comparatively simple in form and easily produced and assembled; also, it is arranged so that it is not subjected to excessive strain or wear. The wearing parts are, however, readily renewed should occasion require.

We have illustrated our improvement in one form in which we have embodied the same, as we find that form to be satisfactory. We desire to remark, in this connection, that we employ the shell or casing feature here shown in connection with other forms of the joint members in which the shell serves merely as a casing member. The engaging members on the shell and joint members might be reversed and the structure be quite satisfactory. We are, however, aware that our improvements are capable of considerable variation in structural details without departing from our invention, and we desire to be understood as claiming the same specifically in the form illustrated, as well as broadly within the scope of the appended claims.

Having thus described our invention, what we claim as new and desire to secure by Letters Patent is:

1. In a shaft coupling, the combination with a shaft member provided with transversely disposed journals; bearing members for said journals, having longitudinally curved bearing surfaces on their outer sides, said bearing surfaces having longitudinal grooves therein, the journal openings in said bearing members being extended entirely therethrough and the journals being provided with thrust bearing surfaces to engage the inner faces of the said journal bearing members; bearing blocks for said journal bearings, having longitudinally curved groove-like bearing seats therein, and transversely disposed lubricant passages opening into said seats; a shaft member having openings therein, adapted to receive said bearing blocks, said bearing blocks being provided with supporting flanges; and a shell adapted to embrace said shaft member and co-acting therewith to retain the parts in position and to provide a casing therefor, said shell being provided with a shaft opening in its outer end having an outwardly projecting flange about the same, and a flexible casing secured to the said flange.

2. In a shaft coupling, the combination with a shaft member provided with transversely disposed journals; bearing members for said journals, having longitudinally curved bearing surfaces on their outer sides, said bearing surfaces having longitudinal grooves therein, the journal openings in said bearing members being extended entirely therethrough and the journals being provided with thrust bearing surfaces to engage the inner faces of the said journal bearing members; bearing blocks for said journal bearings, having longitudinally curved groove-like bearing seats therein, and transversely disposed lubricant passages opening into said seats; a shaft member having openings therein, adapted to receive said bearing blocks, said bearing blocks being provided with supporting flanges; and a member adapted to embrace said shaft member and co-acting therewith to retain the parts in position.

3. In a shaft coupling, the combination with a shaft member provided with transversely disposed journals; bearing members for said journals, having longitudinally curved bearing surfaces on their outer sides; bearing blocks for said journal bearing members, having longitudinally curved groove-like bearing seats therein; a shaft member having openings therein, adapted to receive said bearing blocks, said bearing blocks being provided with supporting flanges; and a shell adapted to embrace said shaft member and co-acting therewith to retain the parts in position and to provide a casing therefor, said shell being provided with a shaft opening in its outer end having an outwardly projecting flange about the same, and a flexible casing secured to the said flange.

4. In a shaft coupling, the combination with a shaft member provided with transversely disposed journals; bearing members for said journals, having longitudinally curved bearing surfaces on their outer sides; bearing blocks for said journal bearing members, having longitudinally curved groove-like bearing seats therein; a shaft member having openings therein, adapted to receive said bearing blocks, said bearing blocks being provided with supporting flanges; and a member adapted to embrace said shaft member and co-acting therewith to retain the parts in position.

5. In a shaft coupling, the combination with a shaft member provided with transversely disposed journals; bearing members for said journals, having longitudinally curved bearing surfaces on their outer sides; bearing blocks for said journal bearing members, having longitudinally curved groove-like bearing seats therein, and transversely disposed lubricant passages opening into said seats; a shaft member having openings therein, adapted to receive said bearing blocks, said bearing blocks being provided with supporting flanges; and a member adapted to embrace said shaft member and co-acting therewith to retain the parts in position.

6. In a shaft coupling, the combination with a shaft member provided with transversely disposed journals; bearing members for said journals; bearing blocks for said journal bearing members; a cylindrical shaft member having openings therein, adapted to receive said bearing blocks, said bearing blocks being provided with supporting flanges at each edge; and a cylindrical shell adapted to embrace said shaft member and bearing blocks, and co-acting to retain the parts in position and to provide a casing therefor, the said shaft member being provided with an annular flange having a groove therein adapted to receive the end of said shell and with spiral grooves, said shell being provided with lugs adapted to be engaged in said spiral grooves whereby said shell is secured in position.

7. In a shaft coupling, the combination with a shaft member provided with transversely disposed journals; bearing members for said journals; bearing blocks for said journal bearing members; a shaft member having openings therein, adapted to receive said bearing blocks, said bearing blocks being provided with supporting flanges at each edge; and a shell adapted to embrace said shaft member and bearing blocks, and co-acting to retain the parts in position and to provide a casing therefor.

8. In a shaft coupling, the combination with a shaft member provided with transversely-disposed journals; bearing members for said journals; bearing blocks for said journal bearing members; a shaft member having openings therein, adapted to receive said bearing blocks, said bearing blocks being provided with supporting flanges at each edge; and a member adapted to embrace said shaft member and bearing blocks, and co-acting to retain the parts in position.

9. In a shaft coupling, the combination with a shaft member provided with transversely-disposed journals; bearing members for said journals having longitudinally-curved bearing surfaces on their outer sides; bearing blocks for said journal bearing members having curved bearing seats therein for said journal bearing members; a shaft member having openings therein adapted to receive said bearing blocks, said bearing blocks and shaft member being provided with coacting portions for limiting the inward movement of said bearing blocks; and a member adapted to embrace said shaft member and bearing blocks and coacting with said shaft member to retain the blocks in position.

10. A shaft coupling comprising a cylindrical shaft member; bearing blocks, said shaft member being provided with openings adapted to receive said bearing blocks; a shaft member having journals therein; journal bearing members coacting with said bearing blocks; and a removable shell adapted to embrace said first named shaft member and coacting therewith to form a casing, said shell being detachably secured to said shaft member.

11. In a shaft coupling, the combination with a shaft member provided with transversely-disposed journals; bearing members for said journals; bearing blocks for said journal bearing members; a shaft member having openings therein, adapted to receive said bearing blocks; and a removable shell adapted to embrace said shaft member and bearing blocks, and coacting to retain the parts in position and to provide a casing therefor.

In witness whereof, we have hereunto set our hands and seals in the presence of two witnesses.

CLARENCE C. BLOOD. [L. S.]
HOWARD E. BLOOD. [L. S.]
MAURICE E. BLOOD. [L. S.]

Witnesses:
F. GERTRUDE TALLMAN,
LUELLA G. GREENFIELD.